J. SCOTT.
TROLLEY HANGER FOR GRADE CROSSING BRIDGES.
APPLICATION FILED DEC. 4, 1916.
1,248,728.
Patented Dec. 4, 1917.
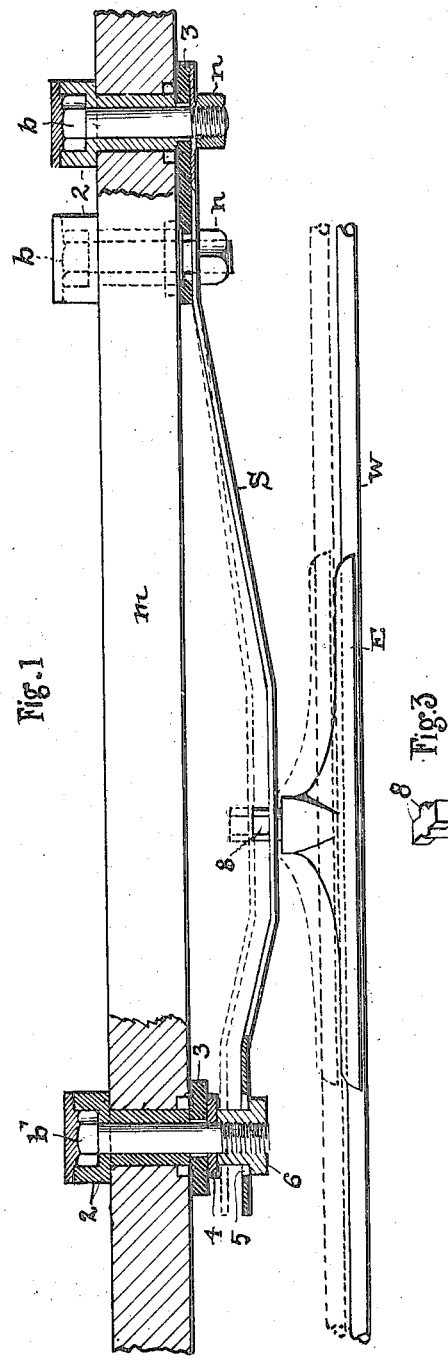
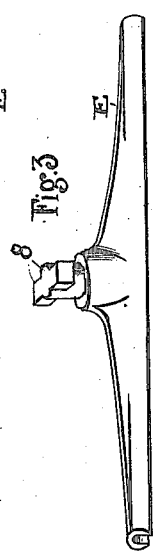
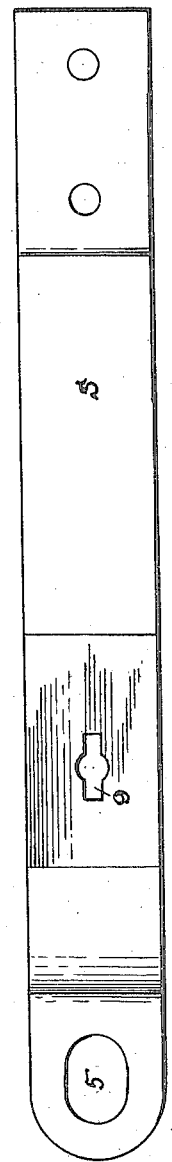
Inventor
James Scott
By
Attorneys

UNITED STATES PATENT OFFICE.

JAMES SCOTT, OF CLEVELAND, OHIO.

TROLLEY-HANGER FOR GRADE-CROSSING BRIDGES.

1,248,728.  Specification of Letters Patent.  Patented Dec. 4, 1917.

Application filed December 4, 1916. Serial No. 134,833.

*To all whom it may concern:*

Be it known that I, JAMES SCOTT, citizen of the United States, residing at Cleveland, in the county of Cuyahoga and State of Ohio, have invented certain new and useful Improvements in Trolley - Hangers for Grade-Crossing Bridges, of which the following is a specification.

The object of the invention is to provide an improved spring hanger for trolley wires for grade crossing bridges and the like, substantially as shown and described and particularly pointed out in the claims.

In the accompanying drawings, Figure 1 is a cross section of a bridge or other structure with a comparatively low overhead portion beneath which the trolley has to pass and the trolley wire is correspondingly depressed and showing the said wire and its flexible support and ear in working relations therewith. Fig. 2 is a plan view of the said spring or flexible member constructed and adapted to be used as shown in Fig. 1. Fig. 3 is a perspective view of the so-called ear.

It is well known that in the passage of an overhead trolley car beneath grade crossing bridges as they are generally constructed the trolley pole is necessarily depressed to such a low level as to come to nearly a horizontal position, and that this condition imposes additional strain upon the trolley and its hangers and also upon the trolley pole and its pivot and resilient supporting connections at the car, and that all said parts are constantly liable to injury or breakage on this account. In fact it is a frequent experience that actual breakage of some essential supporting part occurs under such strained conditions with embarrassing delay to travel and to the operation of the cars. The present invention, therefore, is intended to mitigate these untoward conditions as much as possible by compensating means in the trolley wire support beneath the bridge or crossing.

To these ends I have conceived the invention herein which is more especially disclosed in the flexible member or spring S, represented herein as a strip of flat spring steel of a suitable grade and length proportioned substantially as shown and bowed or bent downward between its ends relatively about as shown in Fig. 1.

At one end the said spring is firmly affixed to the bottom of the bridge frame or structural member $m$ by bolts $b$, which are securely insulated in said structure by porcelain or equivalent sleeves 2 and fiber or like strips or pieces 3 to prevent possible leakage or transmission of the electric current through the same, while the opposite free end of the said spring or flexible member S has an oblong slot 5 through which it is slidably and yieldably engaged with the bridge frame $m$ by means of an insulated connection including a bolt $b'$, porcelain sleeve 2, insulating strip 3 and washer 4, and a stud or socket nut 6 engaging on the end of said bolt and bearing against said washer and otherwise bearing on the bottom of said spring about the oblong slot 5 therein.

The trolley ear E which carries the trolley wire W is secured to the said spring by an integral T-shaped stem 8 centrally on its top extending through a correspondingly-shaped slot 9 in the said spring relatively nearest the free slotted end of the spring and in its downwardly-bowed or bent portion, and the said free slotted end is straight and flat for a short distance and supported in a free operating relation normally at a lower level than the opposite or fixed end, the connections for said spring at both ends being with the bridge frame or wooden span $m$ as above described. It will be noticed that the arms of the stem 8 are transverse to the length of the ear E and when said stem is inserted through the slot 9 the ear is given a quarter turn into position to receive the wire $w$ and is thus locked on said spring.

The free end of the spring is not only adapted to slide within the limits of its slot 5 on the connection set forth but also free to spring or play up and down more or less on the stem of nut 6 to respond to the upward pressure of the trolley. This provides both play and spring action for the trolley and the measure of the play is shown in dotted lines Fig. 1. By placing the supporting ear nearest the free end of the spring I obtain the advantage of longer leverage in the lift and greater relative movement than if it were farther back and this also enables me to avail myself of the spring in the shank of said spring member as an initial protection.

Specifically the stem 8 of the ear E has a round or cylindrical stem conforming to the rounded shape and size of the middle portion of slot 9 in the spring, and two bolt holes and bolts are used in the fixed end of the spring to make the spring secure in its position against turning laterally to either side, both said bolt connections being alike and nuts $n$ serving both to secure the spring in place.

What I claim is:

1. A trolley hanger for grade crossing bridges comprising a trolley wire supporting ear, and a flat spring member adapted at one end to be affixed to a bridge and to play up and down at the other end with a limited spring action and constructed to accommodate said ear between its ends.

2. A spring for a trolley hanger for grade crossing bridges consisting of a strip of flat steel bent downward between its ends and provided with a slot lengthwise at one end and a hole at its opposite end, in combination with a wire supporting ear secured to said strip between its ends.

3. A trolley hanger for grade crossings comprising a flat spring having an oblong slot at one end and means at the other end to fix the same to the overhead portion of a bridge, means extending through said slot adapted to limit the up and down play of the spring at its otherwise free end, and a trolley wire supporting ear rotatably and removably engaged in said spring relatively near its free end.

4. In means for supporting a trolley ear beneath an overhead bridge, a spring having a slot in one end and bolt holes in the other end and bent downward into approximately bow shape between its ends and provided with a slot lengthwise in its bent portion, and a wire supporting ear affixed within said slotted bent portion.

Signed at Cleveland, in the county of Cuyahoga, and State of Ohio, this 18 day of November, 1916.

JAMES SCOTT.

Copies of this patent may be obtained for five cents each, by addressing the "Commissioner of Patents, Washington, D. C."